(12) United States Patent
Nakano

(10) Patent No.: US 8,472,780 B2
(45) Date of Patent: Jun. 25, 2013

(54) TELEVISION AND METHOD FOR CONTROLLING THE SAME

(75) Inventor: Masaki Nakano, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 685 days.

(21) Appl. No.: 12/252,976

(22) Filed: Oct. 16, 2008

(65) Prior Publication Data

US 2009/0102982 A1 Apr. 23, 2009

(30) Foreign Application Priority Data

Oct. 19, 2007 (JP) ................................. 2007-272489

(51) Int. Cl.
*H04N 5/932* (2006.01)
(52) U.S. Cl.
USPC .......................................... 386/201; 386/230
(58) Field of Classification Search
None
See application file for complete search history.

(56) References Cited

U.S. PATENT DOCUMENTS

| | | | |
|---|---|---|---|
| 2004/0244061 A1* | 12/2004 | Okuyama et al. | 725/142 |
| 2005/0122398 A1 | 6/2005 | Ono | |
| 2005/0244132 A1* | 11/2005 | Nakakura | 386/46 |
| 2006/0294265 A1* | 12/2006 | Lefevre et al. | 710/48 |
| 2007/0024462 A1* | 2/2007 | Kitaura | 340/825.22 |

FOREIGN PATENT DOCUMENTS

| | | |
|---|---|---|
| CN | 1625730 A | 6/2005 |
| JP | 07-079387 | 3/1995 |
| JP | 2006-54022 | 2/2006 |

* cited by examiner

*Primary Examiner* — William C Vaughn, Jr.
*Assistant Examiner* — Eileen Adams
(74) *Attorney, Agent, or Firm* — Canon U.S.A., Inc. IP Division

(57) ABSTRACT

A television includes a transmitting and receiving unit that transmits and receives video data to/from an external apparatus connected to the television, a connection terminal, which is connected to the transmitting and receiving unit, and located on a side of the television, and a control unit configured to inhibit the transmitting and receiving unit from outputting video data from the connection terminal unless an instruction removing the inhibit is received.

12 Claims, 3 Drawing Sheets

TELEVISION AND METHOD FOR CONTROLLING THE SAME

BACKGROUND OF THE INVENTION

1. Field of the Invention

The present invention relates to a television connectable to an external video apparatus.

2. Description of the Related Art

A video recording system is known in which a television is connected to an external video apparatus such as a recorder or a digital video camera to record and reproduce a video image.

Generally, various input-output (I/O) terminals for connecting the external video apparatus are disposed on a rear portion of the television and the I/O terminals for one system are disposed on a front portion of the television as "front terminal". The front terminal is typically used for easily connecting a portable video apparatus such as a video camera, etc., instead of connecting apparatus that are to be connected to the television on a permanent basis, e.g., DVD player, etc.

Usually, video recording by the portable video apparatus is carried out for primary buffer during recording, not for creating contents for the purpose of storage. It is not useful for a user that a video from the television is unintentionally recorded in the portable video apparatus which is connected to the front terminal since video data recorded in the portable video apparatus could be overwritten by the video being recorded from the television.

The external video apparatus connected to the front terminal may not always be a portable apparatus. In some cases, for example, an apparatus having a buffer function such as an external hard disk drive (HDD) may be temporarily connected. The external HDD is used to perform recording of video images from a television although the external HDD is not always connected to the television. Therefore, uniform prohibition of video recording by the external video apparatus connected to the front terminal may be inconvenient.

Japanese Patent Application Laid-Open No. 2006-54022 has discussed a recording control device which can set priority on and select a candidate of an external recording apparatus to record broadcast content data when programmed recording is set.

However, in a conventional video recording system, a connection interface which can prevent unintentional recording in the external video apparatus connected to the front terminal and facilitate the video data output for recording if the video recording is to be performed, is not provided.

SUMMARY OF THE INVENTION

According to an aspect of the present invention, a television includes a transmitting and receiving unit configured to transmit and receive video data to/from an external apparatus connected to the television, a connection terminal, connected to the transmitting and receiving unit, and which is located on a side of the television, wherein the external apparatus is connected to the television via the connection terminal, and a control unit configured to inhibit the transmitting and receiving unit from outputting video data from the connection terminal unless an instruction removing the inhibit is received.

According to an embodiment of the present invention, an output of video data from a front terminal can be limited without a complicated operation. More specifically, an output for recording from a terminal which is not intended by a user can be inhibited, and the output for recording can be performed only in a case where the recording is to be performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 2:
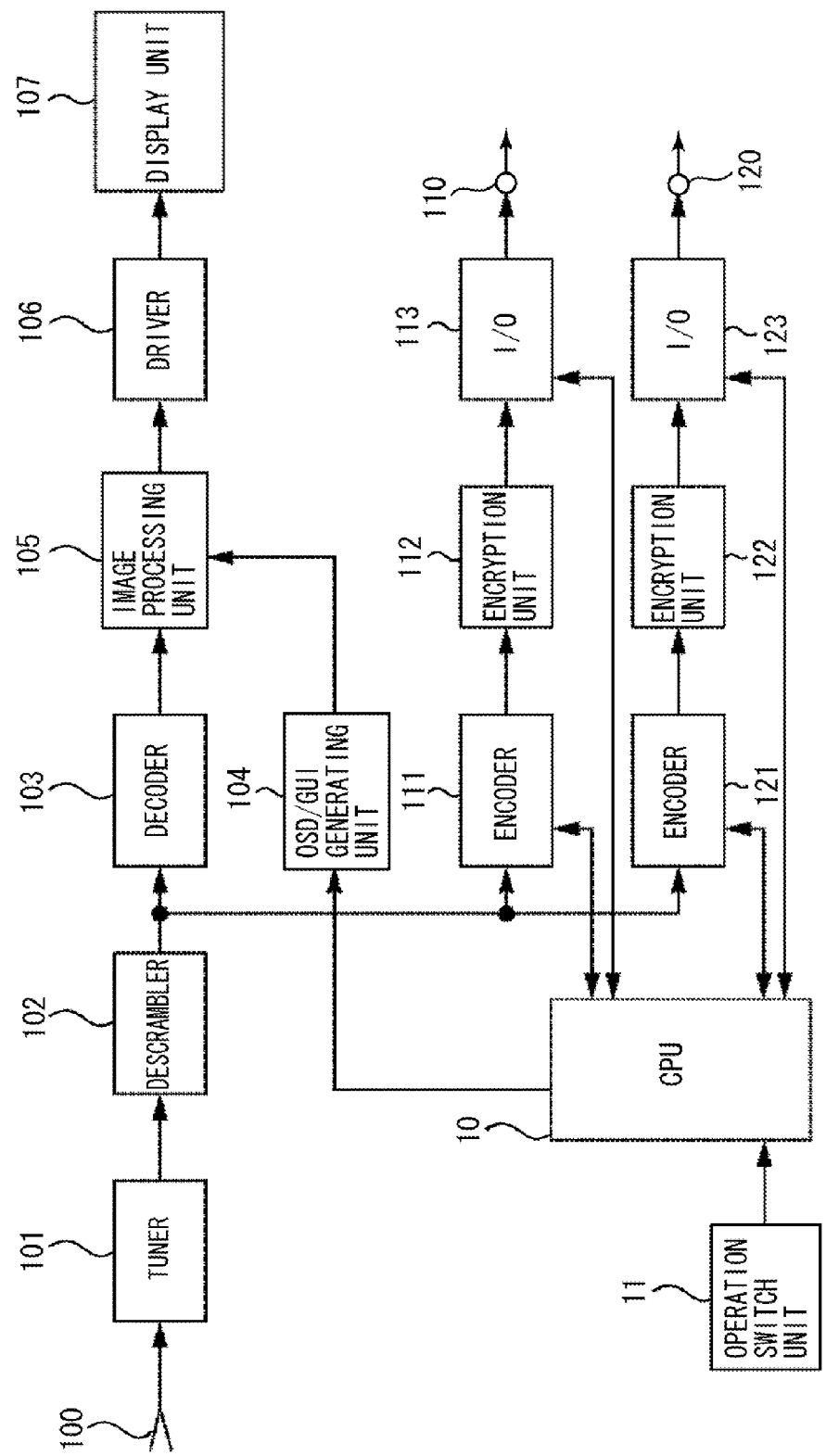
FIG. 2 is a block diagram of the television according to exemplary embodiments of the present invention.

For discussion purposes, in the following description of the present embodiment, reference will be made to a flat panel television. However, the present embodiment is not limited to a flat panel television, and any type of television that would enable practice of the present embodiment is applicable. FIG. 2 is a block diagram of a flat panel television according to exemplary embodiments of the present invention. The television includes a built-in hard disk drive (HDD) (not shown). The HDD is a recording unit for recording video data included in a received broadcast signal.

The broadcast signal is input from a radio frequency (RF) input terminal 100 and tuned and digitally demodulated by a tuner 101. The demodulated broadcast signal is descrambled by a descrambler 102, and a transport stream (TS), which is stream data of a compressed image, is output. The TS is input into a moving picture experts group (MPEG) decoder 103, a first encoder 111 and a second encoder 121, respectively. The MPEG decoder 103 decodes the TS and outputs non-compression video data. An on-screen display (OSD)/graphical user interface (GUI) generating unit 104 generates video data for displaying various types of information about user operations on a screen of a display unit 107 as an operation image. A user interface (I/F) unit is constructed of the OSD/GUI generating unit 104 and an operation switch unit 11.

An image processing unit 105 performs image processing on an image data output from the MPEG decoder 103. More specifically, the image processing unit 105 performs interlace/progressive (I/P) conversion for converting an interlace signal to a progressive signal, scaling for converting resolution corresponding to a number of pixels of a display panel of the display unit 107, frame rate conversion for converting a frame frequency and screen synthesis for synthesizing a plurality of video data of multi-window display and operation image data from the OSD/GUI generating unit 104. The image processing unit 105 displays the processed video data on the display unit 107 via a driver 106.

Output encoders 111 and 121 convert the TS output from the descrambler 102 to a data structure to serially transfer the TS to an external apparatus. The converted video data is scrambled by an encryption unit 112 or 122 and transmitted from an external I/O connection terminal 110 or 120 to the external video apparatus via an I/O transmitting and receiving unit 113 or 123. A central processing unit (CPU) 10 determines which of the two external I/O connection terminals 110 and 120 is used to output the video data, and controls the I/O transmitting and receiving unit 113 or 123 according to the determination. Control communication between the CPU 10 and the external video apparatus is performed via the I/O transmitting and receiving unit 113 or 123 and the external I/O connection terminal 110 or 120.

The external I/O connection terminal (hereinafter referred to as "rear terminal") 110 is disposed on a rear portion of the flat panel television. The external I/O connection terminal 110 is connected to the I/O transmitting and receiving unit 113 and the CPU 10 controls the I/O transmitting and receiving unit 113 to output the video data from the external I/O connection terminal 110 according to user's operation.

The external I/O connection terminal 120 (hereinafter referred to as "front terminal") is disposed on a front portion of the flat panel television. The front portion is on the same side that the screen of the display unit 107 is disposed. The term "front terminal" is being used for description purposes only, and the external I/O connection terminal 120 can be located anywhere on the flat panel television.

The rear and front terminals 110 and 120, in addition to outputting video data to the external video apparatus connected thereto, can also reproduce an image on the display unit 107 by inputting video data which is output from the external video apparatus.

Broadcast contents received by the tuner 101 are recorded in the external video apparatus connected to the rear or front terminal 110 or 120 by control of the CPU 10. The flat panel television and the external video apparatus are connected to each other via, for example, an interface which can perform bidirectional communication, such as a high definition multimedia interface (HDMI), IEEE 1394, or digital living network alliance (DLNA).

Based on the user's operation, the CPU 10 instructs the external video apparatus to execute a recording operation using the control communication function of the above-described interface. The CPU 10 controls the I/O transmitting and receiving unit 113 or 123 to transmit the video data to be recorded from the rear or front terminal 110 or 120. Contents to be recorded by the external video apparatus may be stored on the flat panel television's HDD.

When there is a plurality of external video apparatuses connected to the flat panel television, the CPU 10 appropriately selects the external video apparatuses to record the contents. At that time, the external apparatus connected to the front terminal 120 is not selected as a default. However, when the external apparatus connected to the front terminal 120 is designated by the user's operation, the selection is valid. When the plurality of the external video apparatuses is selectable, selection is made based on a type of recording medium or a remaining capacity of a recordable area.

Figure 1:
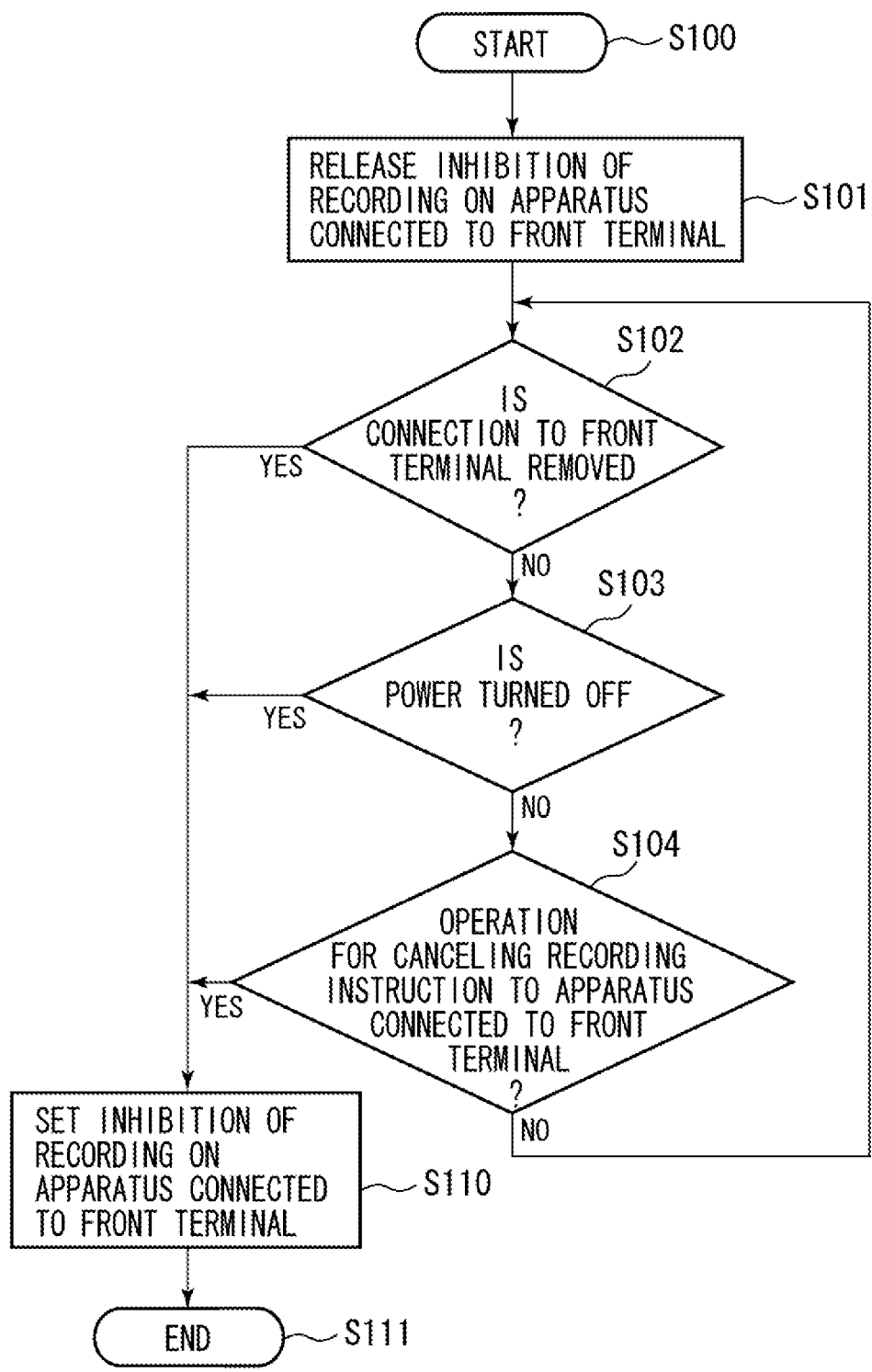
FIG. 1 is a flowchart illustrating operations of a television according to a first exemplary embodiment of the present invention.

FIG. 1 is a flowchart illustrating procedures of selecting the external video apparatuses. Generally, the video data is output to the external video apparatus that is connected to the rear terminal 110. However, when an apparatus connected to the front terminal 120 is designated as a recording apparatus by the user's operation, control is performed according to the flowchart illustrated in FIG. 1.

Turning to FIG. 1, the process is initiated in step S100. Next, in step S101, because, as a default, an output of the video data to the front terminal 120 is inhibited first, the CPU 10 releases inhibition of recording on the external apparatus connected to the front terminal 120 (release of output inhibition of the video data), and selects the external apparatus connected to the front terminal 120.

In step S102, the CPU 10 determines whether connection to the front terminal 120 is removed, in step S103, whether the flat panel television is turned off, and in step S104, whether a recording instruction to the external apparatus connected to the front terminal 120 is cancelled. When the determination in all three steps are negative (NO in steps S102, S103 and S104), a loop of steps S102 to S104 is continuously repeated and, during this period, the video data is output from the front terminal 120 and is recorded in the external apparatus.

If the determination in any of steps S102 to S104 is determined to be positive, (YES in step S102, S103 or S104), the procedure proceeds to step S110. In step S110, the CPU 10 re-sets the inhibition of recording in the external apparatus connected to the front terminal 120 and terminates the process. More specifically, the CPU 10 inhibits the I/O transmitting and receiving unit 123 from outputting the video data from the front terminal 120 upon detecting at least any of the following: removal of the connection to the front terminal 120; the flat panel television is turned off; and the inhibition of recording in the external apparatus connected to the front terminal 120.

In the present exemplary embodiment, two sets of circuit blocks are prepared to output the video data for external recording as a circuit block from the output encoders 111 and 121 to the rear and front terminals 110 and 120. However, the number of circuit blocks is not limited to two sets. For example, in another embodiment, one circuit block may be used.

Second Exemplary Embodiment

Figure 3:
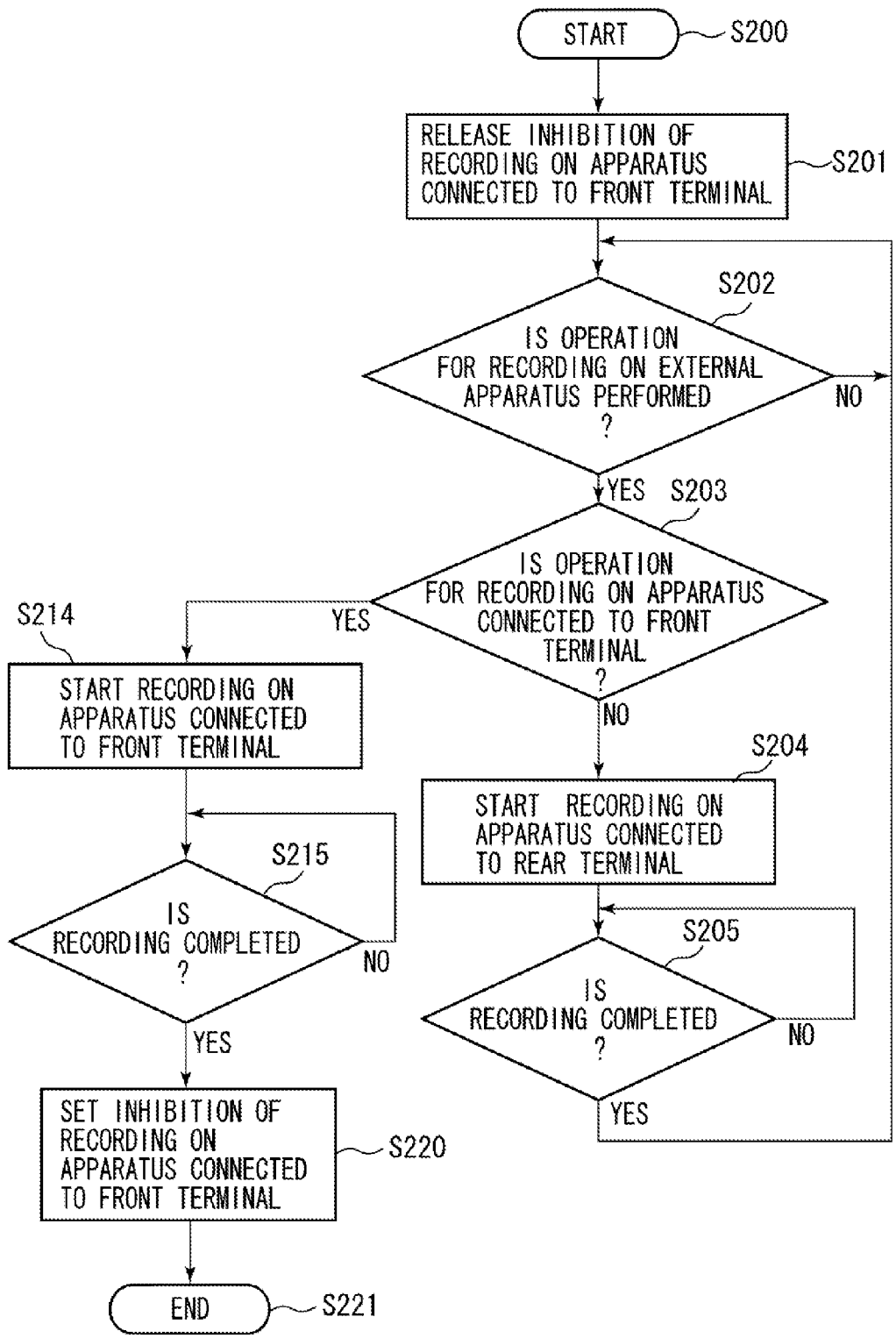
FIG. 3 is a flowchart illustrating operations of a television according to a second exemplary embodiment of the present invention.

The television as described above is applicable to the present embodiment, as such, a detailed description is omitted herein. FIG. 3 is a control flowchart according to a second exemplary embodiment of the present invention. In the present embodiment, a recording output to the external apparatus is typically performed via the rear terminal 110. In the present embodiment, when the inhibition of recording in an external apparatus connected to the front terminal 120 is released by a users operation, control is performed based on the flowchart illustrated in FIG. 3.

Turning to FIG. 3, the process is initiated in step S200. Next, in step S201, the CPU 10 releases the inhibition of recording in the external apparatus connected to the front terminal 120. In step S202, the CPU 10 waits for an instruction from a user for performing the recording operation in the external apparatus. When the instruction for performing the recording operation is issued (YES in step S202), in step S203, the CPU 10 determines whether the instruction for the recording operation is issued to the external apparatus connected to the front terminal 120.

When the instruction for the recording operation is not issued to the apparatus connected to the front terminal 120 (NO in step S203), in step S204, the CPU 10 starts recording via the rear terminal 110. When the recording operation is completed (YES in step S205), the procedure returns to step S202 and the CPU 10 waits the instruction for the recording operation in the external apparatus again.

On the other hand, when the instruction for the recording operation is issued to the apparatus connected to the front terminal 120 in step S203 (YES in step S203), the CPU 10 starts recording in the apparatus connected to the front terminal 120 in step S214 and waits for completion of the recording operation in step S215. When the recording operation is completed (YES in step S215), in step S220, the CPU 10 sets the inhibition of recording in the apparatus connected to the front terminal 120, and the process terminates.

More specifically, in the present exemplary embodiment, recording from the front terminal 120 is performed only once per instruction recording, and when recording is completed, setting is automatically returned to the inhibition of recording from the front terminal 120.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-272489 filed Oct. 19, 2007, which is hereby incorporated by reference herein in its entirety.

What is claimed is:

1. A television comprising:
   a transmitting and receiving unit configured to transmit and receive image data to/from an external apparatus connected to the television;
   a first connection terminal, connected to the transmitting and receiving unit, which is located on a rear portion of the television, wherein a first recording apparatus is connected to the television via the first connection terminal, and the image data is output to the first recording apparatus via the first connection terminal so as to be recorded by the first recording apparatus;
   a second connection terminal, connected to the transmitting and receiving unit, which is located on a portion of the television other than the rear portion, wherein a second recording apparatus is connected to the television via the second connection terminal, and the image data is output to the second recording apparatus via the second connection terminal so as to be recorded by the second recording apparatus;
   a control unit configured to control output of image data to the external apparatus connected to the first connection terminal and the second connection terminal, by controlling the transmitting and receiving unit; and
   a determination unit configured to, in a case where recording instruction operation to the external apparatus is performed, determine whether a recording instruction operation to the first recording apparatus connected to the first connection terminal is performed or whether a recording instruction operation to the second recording apparatus connected to the second connection terminal is performed by a user;
   wherein the control unit inhibits the transmitting and receiving unit from outputting image data to the second recording apparatus connected to the second connection terminal, unless the user inputs an instruction to allow outputting image data to the second recording apparatus connected to the second connection terminal to the television;
   wherein, in a case where the recording instruction operation to the second recording apparatus connected to the second connection terminal is performed by the user, the control unit inhibits the transmitting and receiving unit from outputting the image data to the second recording apparatus connected to the second connection terminal in response to the completion of recording to the second recording apparatus; and
   wherein, in a case where the recording instruction operation to the first recording apparatus connected to the first connection terminal is performed by the user, the control unit does not inhibit the transmitting and receiving unit from outputting the image data to the first recording apparatus connected to the first connection terminal in response to the completion of recording to the first recording apparatus.

2. The television according to claim 1, wherein when the control unit, according to the instruction input by the user, outputs the image data to the second recording apparatus connected to the second connection terminal, then according to a condition for turning off the television, inhibits the transmitting and receiving unit from outputting image data to the second recording apparatus connected to the second connection terminal.

3. The television according to claim 1, wherein the control unit, according to the instruction input by the user, outputs the image data to the external apparatus connected to the second connection terminal, then according to a condition for canceling the output of image data to the second recording apparatus connected to the second connection terminal, inhibits the transmitting and receiving unit from outputting image data to the second recording apparatus connected to the second connection terminal.

4. The television according to claim 1, further comprising:
   a receiving unit configured to receive a broadcast signal; and
   a recording unit configured to record image data included in the broadcast signal.

5. A method for controlling a television, the method comprising:
   transmitting and receiving image data to/from an external apparatus;
   connecting a first recording apparatus to the television via a first connection terminal located on a rear portion of the television, and the image data is output to the first recording apparatus via the first connection terminal so as to be recorded by the first recording apparatus;
   connecting a second recording apparatus to the television via a second connection terminal located on a portion of the television other than the rear portion, and the image data is output to the second recording apparatus via the second connection terminal so as to be recorded by the second recording apparatus;
   controlling output of image data to the external apparatus connected to the first connection terminal and the second connection terminal; wherein controlling comprises inhibiting outputting the image data to the external apparatus connected to the second connection terminal, unless a user inputs an instruction to allow outputting the image data to the external apparatus connected to the second connection terminal to the television;
   determining, in a case where recording instruction operation to the external apparatus is performed, whether a recording instruction operation to the first recording apparatus connected to the first connection terminal is performed or whether a recording instruction operation to the second recording apparatus connected to the second connection terminal is performed by the user;
   in a case where the recording instruction operation to the second recording apparatus connected to the second connection terminal is performed by the user, inhibiting outputting the image data to the external apparatus connected to the second connection terminal in response to the completion of recording to the second recording apparatus; and
   in a case where the recording instruction operation to the first recording apparatus connected to the first connection terminal is performed by the user, not inhibiting the transmitting and receiving from outputting the image data to the first recording apparatus connected to the first connection terminal in response to the completion of recording to the first recording apparatus.

6. The method according to claim 5, wherein controlling comprises, according to the instruction input by the user, outputting the image data to the second recording apparatus connected to the second connection terminal, then according to a condition for turning off the television, inhibiting the transmitting and receiving from outputting image data to the second recording apparatus connected to the second connection terminal.

7. The method according to claim 5, wherein controlling comprises, according to the instruction input by the user, outputting the image data to the external apparatus connected to the second connection terminal, then according to a condition for canceling the output of image data to the second recording apparatus connected to the second connection terminal, inhibiting the transmitting and receiving from outputting image data to the second recording apparatus connected to the second connection terminal.

8. The method according to claim 5, further comprising:
receiving a broadcast signal; and
recording image data included in the broadcast signal.

9. A television comprising:
a transmitting unit configured to transmit image data to an external apparatus connected to the television;
a first connection terminal, connected to the transmitting unit, which is located on a rear portion of the television, wherein a first recording apparatus is connected to the television via the first connection terminal, and the image data is output to the first recording apparatus via the first connection terminal so as to be recorded by the first recording apparatus;
a second connection terminal, connected to the transmitting unit, which is located on a portion of the television other than the rear portion, wherein a second recording apparatus is connected to the television via the second connection terminal, and the image data is output to the second recording apparatus via the second connection terminal so as to be recorded by the second recording apparatus;
a control unit configured to control output of image data to the external apparatus connected to the first connection terminal and the second connection terminal, by controlling the transmitting unit;
a determination unit configured to, in a case where recording instruction operation to the external apparatus is performed, determine whether a recording instruction operation to the first recording apparatus connected to the first connection terminal is performed or whether a recording instruction operation to the second recording apparatus connected to the second connection terminal is performed by a user;
wherein the control unit inhibits the transmitting unit from outputting image data to the second recording apparatus connected to the second connection terminal, unless the user inputs an instruction to allow outputting image data to the second recording apparatus connected to the second connection terminal to the television;
wherein, in a case where the recording instruction operation to the second recording apparatus connected to the second connection terminal is performed by the user, the control unit inhibits the transmitting and receiving unit from outputting image data to the second recording apparatus connected to the second connection terminal in response to the completion of recording to the second recording apparatus; and
wherein, in a case where the recording instruction operation to the first recording apparatus connected to the first connection terminal is performed by the user, the control unit does not inhibit the transmitting and receiving unit from outputting the image data to the first recording apparatus connected to the first connection terminal in response to the completion of recording to the first recording apparatus.

10. The television according to claim 9, wherein when the control unit, according to the instruction input by the user, outputs the image data to the second recording apparatus connected to the second connection terminal, then according to a condition for turning off the television, inhibits the transmitting and receiving unit from outputting image data to the second recording apparatus connected to the second connection terminal.

11. The television according to claim 9, wherein the control unit, according to the instruction input by the user, outputs the image data to the external apparatus connected to the second connection terminal, then according to a condition for canceling the output of image data to the second recording apparatus connected to the second connection terminal, inhibits the transmitting and receiving unit from outputting image data to the second recording apparatus connected to the second connection terminal.

12. The television according to claim 9, further comprising:
a receiving unit configured to receive a broadcast signal; and
a recording unit configured to record image data included in the broadcast signal.

* * * * *